United States Patent [19]

Swinkels et al.

[11] Patent Number: 4,569,676

[45] Date of Patent: Feb. 11, 1986

[54] SEPARATION AND PURIFICATION OF SALTS IN A NON-CONVECTIVE SOLAR POND

[75] Inventors: Godefridus M. Swinkels, Rossland, Canada; Abraham Sadan, Salt Lake City, Utah; Michael A. Rockandel; Hans Rensing, both of Rossland, Canada

[73] Assignee: Cominco Ltd., Vancouver, Canada

[21] Appl. No.: 642,796

[22] Filed: Aug. 21, 1984

[51] Int. Cl.⁴ .............................................. B01D 9/02
[52] U.S. Cl. ................................. 23/295 S; 23/302 R; 23/302 T
[58] Field of Search .................. 23/295 S, 298, 302 T, 23/302 R

[56] References Cited

U.S. PATENT DOCUMENTS

| | | | |
|---|---|---|---|
| 3,372,691 | 3/1968 | Shacar | 126/900 |
| 4,179,493 | 12/1979 | Sadan | 23/302 T |
| 4,333,736 | 6/1982 | Shachar | 23/302 T |

*Primary Examiner*—William Smith

*Attorney, Agent, or Firm*—Stevens, Davis, Miller & Mosher

[57] ABSTRACT

Brine containing at least two salts, one or more of the salts having a higher hydrated form and a lower hydrated or anhydrous form, is fed to a non-convective solar pond and one of the salts having a higher hydrated form and a lower hydrated or anhydrous form is crystallized in a higher hydrated form, dehydrated to a lower hydrated form, and recovered from the bottom of the pond in solid, pure form essentially free from the other salts in the brine. To effect separation, the salt having a higher hydrated form and a lower hydrated or anhydrous form, which is to be recovered in pure form must be present in the pond in an essentially saturated concentration. The concentrations of any of the other salts must generally not exceed saturation concentration at the temperature in the top layer of the pond, and must not exceed saturation concentration at the conditions in the bottom layer of the pond. Concentrations of other salts in the pond must be controlled such that the required density gradient is maintained.

21 Claims, 3 Drawing Figures

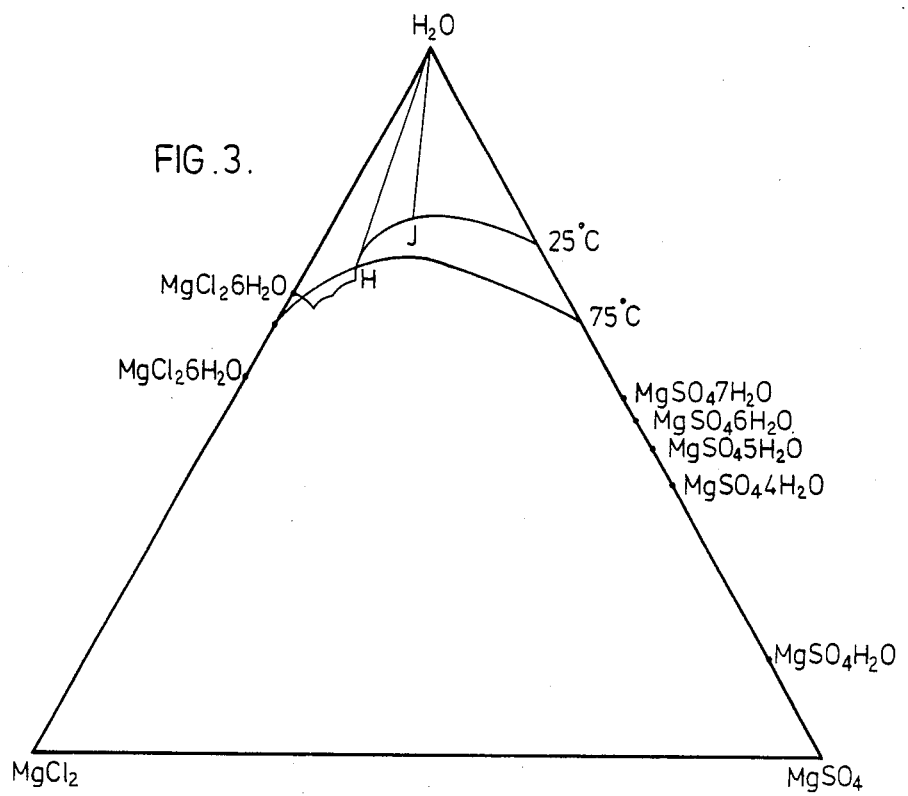

SEPARATION AND PURIFICATION OF SALTS IN A NON-CONVECTIVE SOLAR POND

This invention relates to a method for separating salts in a solar pond and, more particularly, to a method for the purification and separation of a salt from a mixed brine in a non-convective solar pond.

BACKGROUND OF THE INVENTION

The separation of salts in salt mixtures and brines has been conventionally carried out mainly by evaporation and fractional crystallization processes. The recovery of salts from brines has also been carried out by evaporation and fractional precipitation in solar ponds.

According to U.S. Pat. No. 4,294,778, 21% $Na_2CO_3$ brine saturated with NaCl is heated to 40° C., or seeded in a vat to precipitate monohydrate crystals. The saturated brine is prepared by dissolving crude decahydrate containing NaCl and $Na_2SO_4$ obtained from solar evaporation ponds. The process according to U.S. Pat. No. 2,294,778 employs a metastable solution necessitating batch-wise operation; burkeite may precipitate, and the $Na_2SO_4$ concentration is limited to 2.5%.

According to U.S. Pat. Nos. 3,910,773 and 3,977,835, Searles Lake brine is evaporated in a first solar evaporator to crystallize halite, burkeite and trona and in a second solar evaporator to obtain sylvite, glaserite, borax and $Ha_2CO_3 \cdot H_2O$. Further salt separations are carried out by conventional means.

In this process, groups of salts are recovered, solar evaporation ponds are used and no salts are dehydrated. Expensive conventional means are still required to effect further separations.

U.S. Pat. No. 4,072,472 teaches that high-grade NaCl can be recovered by evaporation of $NaCl$—$Na_2SO_4$ brine in a series of solar evaporation ponds, the brine becoming enriched in $Na_2SO_4$ but staying below saturation concentration. Dilution may be necessary to avoid co-crystallization. In this process, the ponds are evaporation ponds and no dehydration takes place.

According to U.S. Pat. No. 4,088,451, Searles Lake brine is concentrated in solar evaporation ponds to provide a mixture of precipitated salts and brine. In this process, the ponds are evaporation ponds, two or more salts are recovered simultaneously and no dehydration occurs.

According to U.S. Pat. No. 4,179,493, hydrated salts are dehydrated in a non-convective solar pond by introducing salt solution into the pond, concentrating the solution in an upper layer of the pond to form crystals of highly hydrated salt, and allowing the crystals to settle to a hotter bottom layer and to recrystallize into a partially or completely dehydrated form of the salt, which is recovered. In this process, solution containing only one salt is treated and no separation or purification of salts is disclosed.

U.S. Pat. No. 4,333,736 shows that solar evaporation ponds and non-convective solar ponds are used for dissolution, precipitation, dehydration, or separation of salts. In this method, selective precipitation and separation of salts is carried out in a multiplicity of ponds. Feed solution must be introduced in and circulated through the bottom layer of the pond. Most importantly, feeding and circulating solution through the bottom layer in a pond can not result in a separation, purification and dehydration of a salt in a mixture of salts.

SUMMARY OF THE INVENTION

These prior art references do not teach the discovery that a mixed brine comprising at least two salts, which include at least one salt which has a higher hydrated form and a lower hydrated or anhydrous form, can be treated in a continuous fashion in a single non-convective solar pond for the selective crystallization, purification and dehydration of a salt having a higher hydrated and a lower hydrated or anhydrous form, and for the rejection of the other salt(s). Partially dehydrated or anhydrous salt is recovered in essentially pure form from the bottom of the pond and a salt solution enriched in the other salts is withdrawn from the top portion of the pond.

More specifically, when a brine, comprising a relatively high concentration of one salt having a higher hydrated and a lower hydrated or anhydrous form, i.e. the desired salt, and concentrations of at least one other salt, normally unsaturated under the conditions prevailing in the pond, is present in a non-convective solar pond, concentration gradients in opposite vertical directions are established in the pond. The at least one salt may also be a salt which has a higher hydrated and a lower hydrated or anhydrous form. The concentration gradient for the desired salt increases towards the bottom of the pond and the concentration gradient for the at least one other salt increases towards the top of the pond. The desired salt crystallizes in its higher hydrated form, crystals sink to the lower portion of the pond, crystals are purified, and are dehydrated when the temperature in the lower portion is at least equal to the transition temperature between the higher hydrated form and a lower hydrated form or the anhydrous form. Crystals of the lower hydrated or anhydrous form essentially free of the other salt(s) are removed. Solution is withdrawn from the top portion of the pond in an amount necessary to maintain the desired material balance. For the separation and purification of the desired salt from the brine to be effected, the desired salt must be present in the pond in a concentration which is essentially saturated, while the other salt(s) must normally be present in concentration(s) not exceeding the saturation concentration(s) at the temperature in the top layer of the pond. The concentrations of other salts in the pond must be controlled such that the pond is maintained non-convective.

It is an object of the present invention to provide a method for the separation and purification of salts from a mixed brine in a non-convective solar pond.

It is another object of the present invention to provide a method for effecting the purification and dehydration of a salt, contained in a mixed brine, said salt having a higher and a lower hydrated or anhydrous form, in a non-convective solar pond.

It is another object to provide a method for the selective crystallization and dehydration and purification of a salt from a mixed brine containing one or more other salts in a non-convective solar pond, at least one of said other salts being a salt having a higher and a lower hydrated or anhydrous form.

These and other objects of the method according to the present invention will become clear from the following detailed description.

Accordingly, there is provided in its broadest form a method for the treatment in a non-convective solar pond having an upper portion and a lower portion and including an upper convective zone and a lower convective zone of a mixed brine containing a desired salt having a higher hydrated form and a lower hydrated or anhydrous form and containing at least one other salt, said method comprising the steps of adding mixed brine to the upper portion of said non-convective solar pond, establishing a concentration gradient in said pond for the desired salt which increases with the depth in said pond, establishing a concentration gradient in said pond for said at least one other salt which decreases with depth in said pond, maintaining a temperature in said lower convective zone which is at least equal to the transition temperature between a higher hydrated form and a lower hydrated form or the anhydrous form of the desired salt, crystallizing the desired salt in a higher hydrated form, dehydrating the desired salt crystallized in the higher hydrated form to a lower hydrated or the anhydrous form, separating and purifying the desired salt in the lower hydrated or the anhydrous form, and recovering the desired salt in the lower hydrated or the anhydrous form substantially free from said at least one other salt from said lower convective zone.

According to a second embodiment, there is provided a method for the treatment in a non-convective solar pond having an upper portion and a lower portion and including an upper convective zone and a lower convective zone of a mixed brine containing a desired salt having a higher hydrated form and a lower hydrated or anhydrous form and containing at least one other salt, said method comprising the steps of: adding mixed brine to the upper portion of said non-convective solar pond; establishing a concentration gradient in said pond for the desired salt which increases with the depth in said pond; establishing a concentration gradient in said pond for said at least one other salt which decreases with depth in said pond; maintaining the concentration of said at least one other salt in the lower convective zone below the saturation concentration of said at least one other salt in the solution in the lower convective zone; maintaining a temperature in said lower convective zone which is at least equal to the transition temperature between a higher hydrated form and a lower hydrated form or the anhydrous form of the desired salt; maintaining the temperatures in said pond at values in the range of about 0° to 100° C.; crystallizing at least a portion of the desired salt in a higher hydrated form in the upper portion; dehydrating the desired salt crystallized in the higher hydrated form to a lower hydrated or the anhydrous form; maintaining the pond non-convective by controlling the density gradient; separating and purifying the desired salt in the lower hydrated or the anhydrous form; withdrawing solution from said upper convective zone; and recovering the desired salt in the lower hydrated or the anhydrous form substantially free from said at least one other salt from said lower convective zone.

According to a third embodiment, there is provided a method for the continuous treatment of a mixed brine in a non-convective solar pond having an upper portion and a lower portion and including an upper convective zone and a lower convective zone, said mixed brine comprising a desired salt having a higher hydrated form and a lower hydrated form or anhydrous form and transition temperatures therebetween, and a plurality of other salts, said other salts comprising one or more salts not having a higher and a lower hydrated or anhydrous form and one or more salts having a higher and a lower hydrated or anhydrous form, which method comprises the steps of: adding said mixed brine to the upper portion of said pond; maintaining the concentration of the desired salt in the upper convective zone below saturation concentration; increasing the concentration of the desired salt in the upper portion by evaporation and/or cooling so that the concentration exceeds the saturation concentration, whereby desired salt crystallizes in a higher hydrated form; maintaining the concentration of any other salt at a value not exceeding saturation concentration in the lower convective zone; dehydrating desired salt crystallized in its higher hydrated form in the lower convective zone and forming solution in the lower convective zone; dissolving in said solution formed in the lower convective zone any of said other salts not having a higher and a lower hydrated or anhydrous form that may have crystallized; recovering desired salt in the lower hydrated or anhydrous form from the bottom portion of the pond, the recovered desired salt being purified and substantially free of said other salts; withdrawing solution from the upper convective zone; and maintaining the pond non-convective by controlling the density gradient.

BRIEF DESCRIPTION OF THE DRAWINGS

The embodiments of the process of the present invention will now be described with reference to the accompanying drawings, wherein

FIG. 3 shows the $MgCl_2$—$MgSO_4$—$H_2O$ phase diagram.

DESCRIPTION OF PREFERRED EMBODIMENTS

Figure 1:
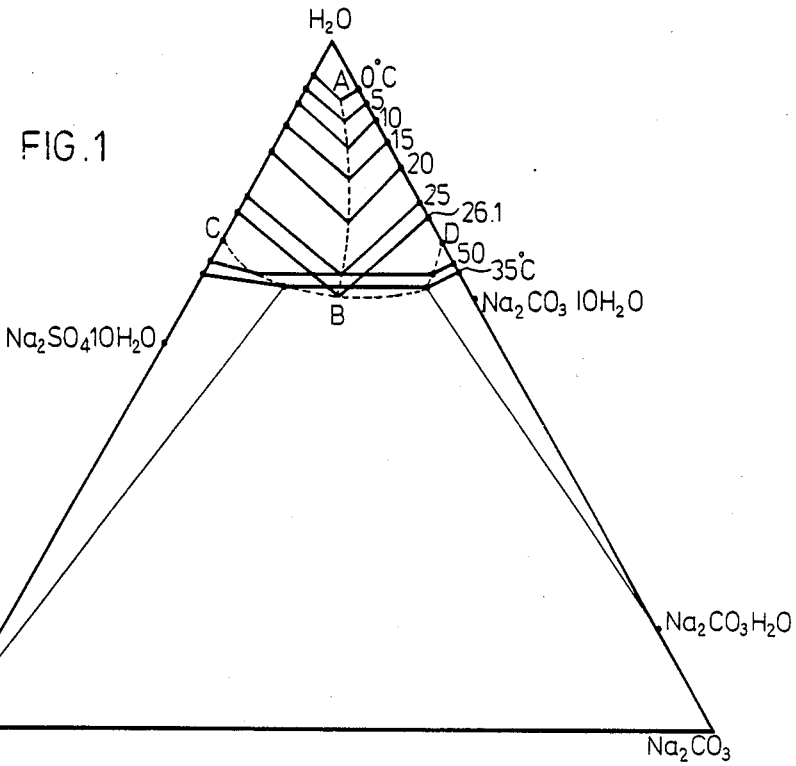
FIG. 1 shows the $Na_2CO_3$—$Na_2SO_4$—$H_2O$ phase diagram.

Salts which have a higher hydrated form and a lower hydrated or anhydrous form, such as sodium carbonate, sodium sulfate, sodium borate and magnesium sulfate can be crystallized from solution in a higher hydrated form which can be dehydrated to a lower hydrated form or the anhydrous form above the transition temperature between the higher hydrated form and the lower hydrated or anhydrous form. The crystallization and dehydration can be carried out in a non-convective solar pond (called NCSP hereinafter and understood to mean an NCSP operating as a dehydration pond) yielding partially dehydrated or anhydrous salt when the transition temperature is in the range of temperatures occurring in an NCSP.

In an NCSP there are three recognizable layers or zones. The uppermost zone is the upper convective zone (UCZ) which is generally at a temperature substantially corresponding to the ambient temperature. The depth of the UCZ varies with climatic conditions, especially air turbulence, and may vary from 10 to 50 cm. The bottom zone is also isothermal and convective and is termed the lower convective zone (LCZ). The LCZ contains brine at maximum, saturated concentration. The non-convective zone (NCZ) or halocline is the third zone, which is intermediate the UCZ and the LCZ, and wherein the salt concentration and the temperature increase with increasing depth.

An NCSP could be operated at temperatures in the UCZ as low as the freezing temperature of the brine and at temperatures in the LCZ as high as the boiling temperature of the brine. For practical purposes, the operational range of an NCSP could be said to be from about 0° to 100° C. In practice, the operational range is determined by the climatic conditions and the transition temperatures of the salts having a higher and a lower hydrated or anhydrous form.

A mixed brine treated according to the method of the invention contains one or more salts, which have a higher hydrated and a lower hydrated or anhydrous form, and one or more other salts. One salt having a higher and lower hydrated or anhydrous form is recovered as the desired salt.

When such mixed brine, which contains a desired salt at essentially saturation concentration at the temperature of the UCZ and other salts at normally below saturation concentration at the temperature prevailing in the UCZ, is present in an NCSP, the desired salt crystallizes in the UCZ and the upper portion of the NCZ in its higher hydrated form by cooling and/or evaporation. The crystals of the higher hydrated form of the desired salt sink downward through the NCZ and are dehydrated in the LCZ to a lower hydrated or the anhydrous form at a temperature at least equal to the transition temperature between the higher hydrated form and the lower hydrated or anhydrous form. The partially dehydrated or anhydrous crystals of the desired salt are removed from the bottom of the pond.

Mixed brine is added to the pond and the brine can contain the desired salt in either unsaturated or at substantially saturation concentration. In the case of feeding mixed brine unsaturated with respect to the desired salt at the temperature of the mixed brine, the brine reaches saturation in the upper region of the pond by cooling and/or evaporation. If desired, an unsaturated mixed brine may be concentration in a solar evaporation pond or by other conventionally known methods prior to the mixed brine being added to the NCSP. Of course, the mixed brine added to the pond after such concentration must then be present in the pond in substantially saturation concentration with respect to the desired salt and be normally unsaturated with respect to the other salts.

The other salts in the mixed brine, when present below saturation concentrations, will enter the NCSP in the feed brine and the concentration of the other salts in the pond will gradually increase until a steady-state concentration is reached which is usually maintained by withdrawing an amount of solution from the NCSP. It has now been surprisingly discovered that, contrary to expectations, each of the other salts establishes a concentration gradient which is opposite to that for the desired salt. In an NCSP operating under steady-state conditions (in a dehydration mode), the concentration of the desired salt increases with depth, while the concentrations of the other salts, including other salts having a higher and a lower hydrated or anhydrous form, are highest in the UCZ, decrease downward through the NCZ and the LCZ and reach their lowest values in the LCZ. By establishing the opposite concentration gradients, the other salts can be removed from the NCSP at concentrations higher than can be attained by conventional separations such as by using solar evaporation ponds. It has also been discovered that, in some cases, one of the other salts may become saturated in the pond and will form a small amount of crystals. When such crystals sink towards the bottom, they will redissolve in the solution in the LCZ which includes the water liberated by the dehydration of the desired salt. An example of such a salt is NaF in a $Na_2CO_3$—containing brine. NaF has a limited solubility in $Na_2CO_3$ solutions and the NaF concentration may exceed saturation concentration, especially when nighttime cooling lowers the saturation concentration. It is, however, essential that in order to allow crystallization of any of the other salts, the concentrations of such salts must not exceed saturation concentration in the LCZ. The concentrations of the other salts must also not be too high so that the density gradient, as will be defined hereinafter, becomes too small for the pond to remain non-convective. Salt concentrations in the mixed brine and in the pond can be controlled by the addition of water. Water may be added as necessary either to the mixed brine or to the pond, as desired.

The method of the invention is particularly useful for the recovery of pure sodium carbonate monohydrate or pure anhydrous sodium sulfate from mixed brines comprising sodium-carbonate, -bicarbonate, -sulfate and -chloride and/or -fluoride; of partially dehydrated borax from mixed brines comprising sodium-borate and -carbonate; of partially dehydrated magnesium sulfate from mixed brines comprising magnesium-chloride and -sulfate; of anhydrous sodium sulfate or magnesium sulfate monohydrate from a mixed brine comprising these sulfates; and of anhydrous sodium sulfate from a mixed brine comprising sodium sulfate and sodium chloride. It is understood that recoveries of salts can be made from salt systems other than the ones noted and from the noted systems also containing yet other salts, e.g., potassium chloride. A mixed brine can, therefore, contain at least two salts chosen from the group comprising sodium carbonate, sodium bicarbonate, sodium borate, sodium sulfate, sodium chloride, potassium chloride, sodium fluoride, magnesium sulfate and magnesium chloride, said salts including a desired salt chosen from the group consisting of sodium carbonate, sodium borate, sodium sulfate and magnesium sulfate. A mixed brine can also contain at least three salts chosen from the group comprising sodium carbonate, sodium bicarbonate, sodium borate, sodium sulfate, sodium chloride, potassium chloride, sodium fluoride, magnesium sulfate and magnesium chloride, said salts including a desired salt chosen from the group consisting of sodium carbonate being recovered as sodium carbonate monohydrate from the lower convective zone controlled at a temperature in the range of about 35° to 45° C., sodium sulfate being recovered as anhydrous sodium sulfate from the lower convective zone controlled at a temperature in the range of about 32° to 42° C., magnesium sulfate recovered as magnesium sulfate monohydrate from the lower convective zone controlled at a temperature in the range of about 68.5° to 80° C., and sodium borate recovered as sodium borate tetrahydrate from the lower convective zone controlled at a temperature in the range of about 60° to 70° C.

For example, when a mixed brine containing $Na_2CO_3$ at unsaturated or substantially saturation concentration and other salts, which may include $Na_2SO_4$, at below saturation concentrations is added to an NCSP, $Na_2CO_3.10H_2O$ crystallizes when saturation with respect to sodium carbonate is exceeded. The decahydrate crystals sink and the decahydrate dehydrates to $Na_2CO_3.H_2O$ in the bottom portion of the pond when the temperature in the LCZ is at least equal to the transition temperature. The $Na_2CO_3.H_2O$ crystals are purified, separated and recovered. The other salts in the mixed brine are accumulated in the UCZ due to the opposite concentration gradients and are removed with the solution withdrawn from the top of the pond.

Similarly, when a mixed brine containing $Na_2SO_4$ at unsaturated or substantially saturation concentration and other salts, which may include $Na_2CO_3$, at below saturation concentrations is added to an NCSP, $Na_2SO_4.10H_2O$ crystallizes when saturation with sodium sulfate is exceeded. The decahydrate crystals sink and are dehydrated, purified and separated in the LCZ when the temperature in the LCZ is at least equal to the transition temperature. Substantially pure anhydrous $Na_2SO_4$ is removed and other salts accumulated in the UCZ due to the opposite concentration gradients are removed in the withdrawn solution.

It is noted that the NCSP can be operated such that, depending on the feed brine composition, either pure $Na_2CO_3.H_2O$ or pure $Na_2SO_4$ is produced.

Thus, the only salt in a mixed salt solution or brine which crystallizes from the brine and dehydrates in the LCZ is the salt which has a concentration gradient increasing with depth. All other salts, including salts having a higher hydrated and a lower hydrated or anhydrous form, have concentration gradients decreasing with depth.

It is important to control the extent to which crystallization of the desired salt occurs in the NCSP. Crystallization is affected by cooling, evaporative cooling, concentration by evaporation and diurnal and seasonal temperature variations. Concentration by evaporation and cooling causes crystallization in the top portion of the pond, i.e. in the UCZ and in the upper portion of the NCZ, and can cause the crystallization of too large an amount of hydrated salt, which in turn can cause the temperature in the LCZ to decrease below the transition temperature.

The rate of crystallization of the desired salt is controlled by controlling the salt concentrations in the mixed brine fed to the UCZ or the upper portion of the NCZ, by controlling the rates of addition of mixed brine and water and by controlling the amount of mixed brine added to the pond and the amount of solution withdrawn from the pond relative to each other.

Another important parameter is the density gradient in the NCSP. Unless a sufficient density gradient can be maintained, the pond will not retain its non-convective characteristics and will become unstable. Because of the opposite concentration gradients, the concentrations of any other salt in the mixed brine must be limited to values that ensure that the density of the brine in the LCZ is sufficiently higher than the brine density in the UCZ.

The density gradient is controlled by controlling the concentrations of other salts in the feed brine, by controlling the amount of added water and by controlling the amount of withdrawn solution. More dilute brine can be fed as long as the concentration of the desired salt attains saturation in the upper portion of the pond.

Solution is removed from the NCSP by withdrawing solution from the top portion of the UCZ. The withdrawal is preferably made from a location in the pond remote from the area of the pond to which feed brine is added. The amount of withdrawn solution should be sufficient to maintain the desired material balance in the pond, which is effected in a manner such that the quantities of other salts in the withdrawn solution are the same as or exceed the quantities of other salts in the feed brine. The amount of the withdrawn solution is also chosen with that the desired density and temperature gradients are maintained.

A portion of the withdrawn solution may be purged from the system. Another portion may be used for recycling to control crystallization, or salt concentrations. The recycled portion may also be used, for example, for dissolving solid salts, thereby to form a feed brine for the NCSP.

The depth of the pond should be such that the LCZ is maintained at a temperature, or reaches a temperature, at least equal to the transition temperature of the desired salt, i.e. the transition temperature of the desired salt in the form in which it is to be recovered. For example, in the recovery of sodium carbonate monohydrate, the depth of the pond is adjusted such that the temperature in the LCZ is at least about 35° C. and should preferably be in the range of from about 35° to about 45° C. For the recovery of anhydrous sodium sulfate the depth of the pond is adjusted such that the temperature in the LCZ is at least about 32° C. and preferably in the range of about 32° to 42° C. For magnesium sulfate monohydrate and sodium borate tetrahydrate these temperatures are, respectively, at least about 68.5° C. and about 60° C., with preferable temperature ranges of about 68.5° to 80° C. and about 60° to 70° C. The depth of the pond can be varied with climatic conditions. For example, with the occurrence of low temperatures (0°–20° C.) in the winter time, the depth of the pond should be increased to be able to operate satisfactorily with a less steep temperature gradient. The pond can be as deep as 3 m or as shallow as 0.3 m, but the depth is usually in the range of about 0.5 to 3 m, more usually in the range of about 0.5 to 2 m.

The temperature in the LCZ is controlled to maintain pond stability. The temperature in the LCZ is preferably controlled at temperatures not exceeding about 10 Celcius degrees above the transition temperature of the desired salt. Control of the temperature in the LCZ is effected by regulating the amount of salt that crystallizes. For example, when operating the pond with a constant depth, the temperature in the LCZ is lowered by increasing the amount of crystallized salt.

Accordingly, the NCSP is operated at temperatures in the range of from about 0° C. to about 80° C. with salts having transition temperatures in the range of about 30° to 70° C. It is understood that a salt having a transition temperature above 70° C. will allow operation at temperatures in the LCZ higher than 80° C.

Substantially pure crystals of the desired salt are removed from the bottom of the pond. The removed crystals may contain very small amounts of other salts contained in the entrained solution and which can usually be removed by washing the crystals.

The suitability of a mixed brine for treatment according to the method of the invention is in part determined by the phase diagram of a salt system.

With reference now to FIG. 1, FIG. 1 shows the $Na_2CO_3$—$Na_2SO_4$—$H_2O$ phase diagram wherein the isotherms for temperatures from 0° C. to 50° C. are shown. Any NaCl present in this system would depress the solubilities of $Na_2CO_3$ and $Na_2SO_4$, but high concentrations of NaCl can be allowed before the presence of NaCl would interfere with the separation of $Na_2CO_3$ or $Na_2SO_4$ and their respective recoveries as partially dehydrated and anhydrous salt. Because the LCZ would be substantially free of NaCl, no depression of solubilities occurs in that region. Point B is an invariant point at 26.1° C. The process of the present invention for the $Na_2CO_3$—$Na_2SO_4$ system is operated with temperatures in the range of from the freezing point of the brine, i.e. about 0° C., to about 42° to 45°C. Practically, temperatures about 10 Celcius degrees above the transition temperatures have been observed before the pond becomes convective. Theoretically, feed solutions containing $Na_2CO_3$ and $Na_2SO_4$ which have compositions on the isotherms which are in the area in the phase diagram below the 0° C. isotherm and to the right of line AB ($Na_2CO_3$—$Na_2SO_4$ saturation) yield pure $Na_2CO_3.H_2O$ upon addition to the NCSP provided that the compositions in the LCZ do not permit the precipitation of burkeite, i.e. compositions to the right of line BD ($Na_2CO_3$—$Na_2CO_3.H_2O$—burkeite saturation) in the sodium carbonate monohydrate field on the 35° to 45° C. isotherms (35° C. and 50° C. isotherms shown). Theoretically, feed solutions containing $Na_2CO_3$ and $Na_2SO_4$ which have compositions of the isotherms in the area below the 0° C. isotherm and to the left of line AB yield pure anhydrous $Na_2SO_4$ upon addition to the NCSP provided that the compositions in the LCZ are to the left of line BC ($Na_2SO_4$—burkeite saturation) in the anhydrous $Na_2SO_4$ field on the 32° to 42° C. isotherms. In practice, solutions must be unsaturated with respect to the salt which is to be removed with the brine withdrawn from the pond at the conditions that prevail in the pond and the requirement for a sufficient density gradient must be satisfied.

Figure 2:
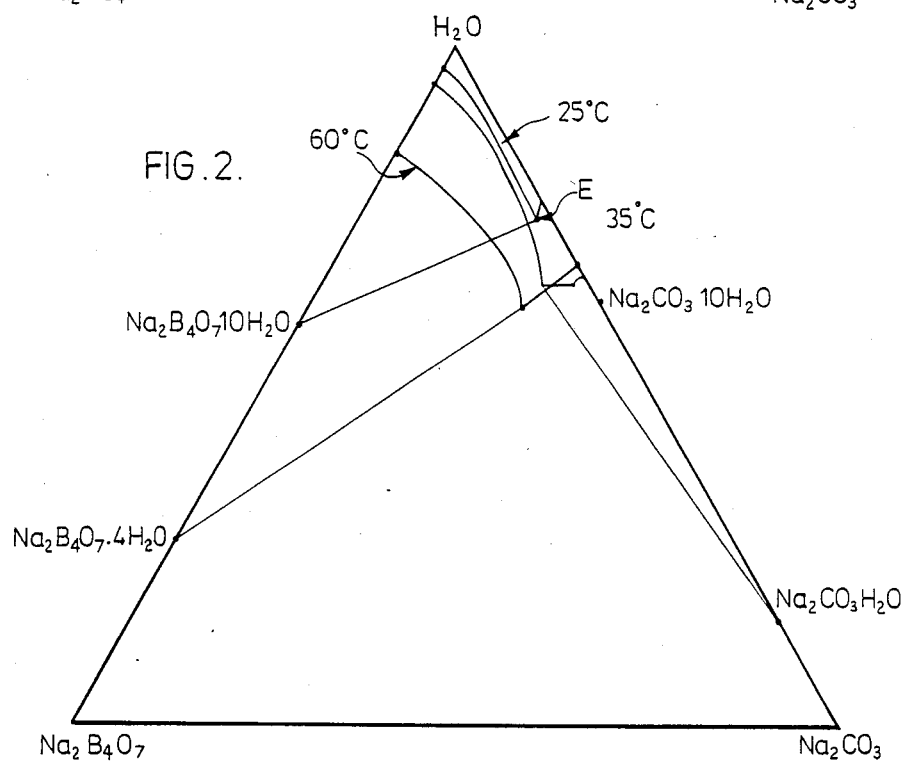
FIG. 2 shows the $Na_2B_4O_7$—$Na_2CO_3$—$H_2O$ phase diagram.

With reference to FIG. 2, FIG. 2 shows the $Na_2B_4O_7$—$Na_2CO_3$—$H_2O$ phase diagram wherein the 25°, 35° and 60° C. isotherms have been indicated. The transition temperature of the sodium borate decahydrate to the tetrahydrate is about 60° C. Because of the low values for the sodium borate content of solutions containing sodium borate and sodium carbonate, only solutions in the area of the phase diagram defined by the 25° C. isotherm and the line drawn through point E and $H_2O$ can be treated for the recovery of partially dehydrated sodium borate, i.e. $Na_2B_4O_7.4H_2O$. However, because of the need to maintain an adequate density gradient, the maximum $Na_2CO_3$ concentration should be restricted to about 9% in the UCZ, thereby limiting the compositions of suitable feed solutions.

With reference to FIG. 3, FIG. 3 shows the $MgSO_4$—$MgCl_2$—$H_2O$ phase diagram wherein the isotherms for 25° and 75° C. have been indicated. The transition temperature for $MgSO_4$ are 2° C. for partial dehydration from $12H_2O$ to $7H_2O$, 48.5° C. for $7H_2O$ to $6H_2O$ and 68.5° C. for $6H_2O$ to $1H_2O$. Magnesium sulfate monohydrate could be recovered from an NCSP when feed solutions having compositions generally on or above the 25° C. isotherm and to the right of the line through point H and $H_2O$ are added to the pond. However, feed solutions outside the area as defined can be treated as long as the $MgCl_2$ concentration in the LCZ does not exceed the saturation concentration at the temperature in the LCZ. However, a necessary density gradient usually limits the suitable compositions to those compositions situated in the diagram above the 25° C. isotherm and to the right of the line through point J and $H_2O$.

The invention will now be illustrated by means of the following non-limitative examples.

EXAMPLE 1

This example illustrates the separation and purification of sodium carbonate from mixed brine in an NCSP.

A brine containing $Na_2CO_3$, $Na_2SO_4$ and NaCl was fed to an operating NCSP. The NCSP had a bottom surface area of 400 m² and held 270 m³ brine at an average depth of 0.62 m. The feed brine was distributed at a rate of 70.9 t/d to one side of the UCZ of the pond. The feed brine contained 390 g/L $Na_2CO_3$, 50 g/L $Na_2SO_4$ and 5.0 g/L NaCl and was substantially saturated with $Na_2CO_3$ at a temperature of 30° C. The sodium carbonate crystallized as its decahydrate and the decahydrate crystals sank towards the bottom portion of the pond where the crystals dehydrated to the monohydrate form. After steady-state conditions had established in the NCSP, additional amounts of sodium sulfate and sodium chloride were added to the pond over a period of one month operation. Total amounts of 3t $Na_2SO_4$ and 1.5t NaCl were added.

Three days after the additions were completed, monohydrate was removed from the bottom of the pond, and, after analysis, was found to contain 0.08% $Na_2SO_4$ and 0.04% NaCl. After washing of the monohydrate crystals with a small quantity of water, the $Na_2SO_4$ and NaCl contents had been substantially removed. Brine was withdrawn from the top portion of the pond at a location at a depth of 2.5 cm well removed from the area of the distribution of feed brine. The withdrawn brine was analyzed and found to contain 5.2% $Na_2SO_4$ and 1.3% NaCl by weight.

Brine samples were taken at a number of points at increasing depths from the surface of the pond. The samples were analyzed. The temperature and brine density were also measured at various depths and the values recorded. Test results are tabulated in Table II.

TABLE II

| Depth cm | Temp. °C. | Density g/cm³ | $Na_2CO_3$ % | $Na_2SO_4$ g/l | $Na_2SO_4$ % | NaCl g/l | NaCl % |
|---|---|---|---|---|---|---|---|
| 2.5 | | | 20 | 65.1 | 5.2 | 16.1 | 1.3 |
| 5.0 | 22.0 | 1.294 | 23 | 55.3 | 4.3 | 13.8 | 1.1 |
| 7.5 | | | | 33.7 | 2.6 | 8.8 | 0.7 |
| 10 | | | | 21.0 | 1.5 | 5.3 | 0.4 |
| 25 | 34.5 | 1.348 | 32 | | | | |
| 35 | 36.5 | 1.358 | 33 | | | | |
| 45 | 37.0 | 1.360 | | 17.9 | 1.3 | 3.8 | 0.3 |
| 55 | 37.5 | 1.362 | | | | | |

Two further samplings were made at a different time of day. The results measured at 0 and 45 cm depths are shown in Table III.

TABLE III

| Depth cm | Temp. °C. | Density g/cm³ | $Na_2CO_3$ % | $Na_2SO_4$ g/l | $Na_2SO_4$ % | NaCl g/l | NaCl % |
|---|---|---|---|---|---|---|---|
| 0 | 18.0 | 1.253 | 17 | 79.3 | 6.3 | 23.4 | 1.0 |
| 45 | 33.0 | 1.358 | 33 | 17.0 | 1.2 | 4.2 | 0.3 |

A brine containing 79.3 g/L $Na_2SO_4$ and 23.4 g/l NaCl was removed from the top of the pond. $Na_2CO_3.H_2O$ containing 0.08% $Na_2SO_4$ and 0.04% NaCl was removed from the bottom of the pond.

The results clearly show that an impure sodium carbonate brine can be fed to an NCSP even when containing increased amounts of impurity salts, that the monohydrate recovered from the pond is substantially pure and that the impurity salts accompanying the sodium carbonate brine fed to the pond are substantially removed with the brine withdrawn from the top portion of the NCSP. It can also be seen that the concentration of $Na_2SO_4$ in the top layer of the pond can be as high as 80 g/L (6.3%). The concentrations of the $Na_2SO_4$ and NaCl at various depths show that these salts have concentration gradients in opposite direction compared to the $Na_2CO_3$ concentration gradient.

EXAMPLE 2

This example illustrates the recovery of substantially pure sodium carbonate monohydrate from a brine also containing NaF, NaCl and $Na_2SO_4$. The brine was prepared by calcining salt from a salt deposit and dissolving the calcined salt. The salt contained 97% $Na_2CO_3$ equivalent, 0.9% NaF, 0.5% NaCl and 0.5% $Na_2SO_4$. The dissolved salt brine was fed to the UCZ of an NCSP together with an amount of water sufficient to make up at least part of the water lost by evaporation from the pond. The UCZ was at 20° C. and contained 20% $Na_2CO_3$, 0.2% NaF, 5% NaCl and 5% $Na_2SO_4$. Over a period of time the NaF concentration in the UCZ was observed to vary between 0.2 and 0.7%. At the higher concentration, some NaF crystallized, but this precipitated NaF dissolved in the LCZ and did not contaminate the sodium carbonate monohydrate. The LCZ was at 37° C. Solution substantially saturated with respect to $Na_2CO_3$ was withdrawn from the top of the pond and was used to dissolve more calcined salt while precipitating NaF. The withdrawn solution contained 20% $Na_2CO_3$, 0.2% NaF, 5% NaCl and 5% $Na_2SO_4$. Substantially pure $Na_2CO_3.H_2O$ saturated with brine containing 0.2% NaF, 1% NaCl and 1% $Na_2SO_4$ was removed from the LCZ of the pond and after washing-out the brine, the NaF, NaCl and $Na_2SO_4$ contents were substantially eliminated.

EXAMPLE 3

Partially dehydrated sodium borate is recovered from a brine also containing sodium carbonate by adding brine containing 3% $Na_2B_4O_7$ and 9% $Na_2CO_3$ by weight to the UCZ of a 1 m deep NCSP. The LCZ is at the transition temperature of $Na_2B_4O_7.10H_2O$ to $Na_2B_4O_7.$—$4H_2O$. Substantially pure $Na_2B_4O_7.4H_2O$ is recovered and brine containing 2.0% $Na_2B_4O_7$ and 8.9% $Na_2CO_3$ is withdrawn from the UCZ.

The temperature gradient in the pond is 50° C./m and the concentration gradient is 3%/m. The concentration gradients for $Na_2CO_3$ and $Na_2B_4O_7$ are in directions opposite from each other.

The concentrations of $Na_2B_4O_7$ and $Na_2CO_3$ and temperatures at various depths in the pond are given in Table I.

TABLE I

| Depth in cm | Temp. in °C. | Concentration $Na_2B_4O_7$ in % | Concentration $Na_2CO_3$ in % |
| --- | --- | --- | --- |
| 0 | 20 | 2.0 | 8.9 |
| 10 | 23 | 2.3 | 8.7 |
| 20 | 27 | 3.0 | 8.5 |
| 40 | 37 | 3.5 | 7.3 |
| 60 | 47 | 8.8 | 4.5 |
| 80 | 55 | 12.1 | 1.5 |
| 100 | 60 | 14.6 | 0.0 |

EXAMPLE 4

This example illustrates that substantially pure $Na_2CO_3.H_2O$ can be recovered from a brine containing $Na_2CO_3$ and $Na_2SO_4$. A brine containing by weight 14% $Na_2CO_3$ and 4% $Na_2SO_4$ is added to one side of the UCZ of an NCSP. The UCZ containes 16% $Na_2CO_3$ and 8% $Na_2SO_4$ and is at 20° C. The LCZ is maintained at 35° C. $Na_2CO_3.10H_2O$ crystallizes in the NCZ and crystals sink to the LCZ. The crystals contain 2% (maximum) $Na_2SO_4$ in solid solution and form substantially pure $Na_2CO_3.H_2O$ and a solution comprising 2.5% $Na_2SO_4$ at 35° C. in the LCZ. $Na_2CO_3.H_2O$ containing 0.2% $Na_2SO_4$, which is entrained in the brine accompanying the $Na_2CO_3.H_2O$, is recovered from the LCZ. A brine containing 16% $Na_2CO_3$ and 8% $Na_2SO_4$ is withdrawn from the other side of the UCZ.

EXAMPLE 5

The test of Example 4 is repeated with addition at 25° C. of a mixed brine containing 22% $Na_2CO_3$ and 4% $Na_2SO_4$. The mixed brine feed is substantially saturated at 25° C. with respect to $Na_2CO_3$. The UCZ is at 20° C. and containes 16% $Na_2CO_3$ and 8% $Na_2SO_4$. $Na_2CO_3.10H_2O$ precipitates by cooling during the night giving a solution containing 16.5% $Na_2CO_3$ and 5% $Na_2SO_4$. Then, evaporation and crystallization yields a brine of the same composition as that of the UCZ. The density gradient is maintained by withdrawing a quantity of brine containing 16% $Na_2CO_3$ and 8% $Na_2SO_4$ from the UCZ of the pond.

EXAMPLE 6

This example illustrates that substantially pure $Na_2SO_4$ can be recovered from a brine containing $Na_2SO_4$ and $Na_2CO_3$. A brine containing 10% $Na_2SO_4$ and 8% $Na_2CO_3$ by weight is added to one side of the UCZ of an NCSP operated for the recovery of anhydrous $Na_2SO_4$. The UCZ contains 12% $Na_2SO_4$ and 12% $Na_2CO_3$ and is at 20° C., the LCZ is maintained at 35° C. Evaporation of added brine yields a solution containing 13% $Na_2SO_4$ and 9.5% $Na_2CO_3$. crystallization of $Na_2SO_4.10H_2O$ and evaporation then yields brine containing 12% $Na_2SO_4$ and 12% $Na_2CO_3$. Crystallized $Na_2SO_4.10H_2O$ contains 2% (maximum) $Na_2CO_3$ in solid solution. The crystals form substantially pure $Na_2SO_4$ in the LCZ, generating a solution containing 2.5% $Na_2CO_3$. Substantially pure $Na_2SO_4$ is removed from the LCZ and a brine containing 12% $Na_2SO_4$ and 12% $Na_2CO_3$ is withdrawn from the LCZ at a point remote from the side of addition of brine.

It can be seen from Examples 4, 5 and 6 that a substantially pure dehydrated salt can be obtained from a mixed brine containing two salts having higher and lower hydrated forms and that the concentration gradients are in opposite directions. The compositions of brine removed with the crystals from the LCZ is well clear of any point at which burkeite would precipitate. Adequate density gradients are maintained.

EXAMPLE 7

This example illustrates the recovery of substantially pure magnesium sulfate monohydrate from a brine also containing magnesium chloride in an NCSP. A solution containing 6% $MgSO_4$ and 6% $MgCl_2$ by weight is added to an NCSP. The UCZ is at 25° C. and contains 11% $MgSO_4$ and 12% $MgCl_2$. The LCZ is at 75° C. The added solution concentrates to 11.5% $MgSO_4$ and 12% $MgCl_2$ at 25° C. at which point $MgSO_4.H_2O$ crystallizes. The crystals sink to the LCZ wherein they dehydrate to pure $MgSO_4.H_2O$. Substantially pure $MgSO_4.H_2O$ is removed from the bottom of the pond and brine containing 5% $MgSO_4$ and 22% $MgCl_2$ is withdrawn from the UCZ.

EXAMPLE 8

This example illustrates the temperature, density and salts concentration profiles for an operating NCSP to which a brine containing $Na_2CO_3$, $NaHCO_3$, NaCl and $Na_2SO_4$ was added and from which substantially pure $Na_2CO_3 \cdot H_2O$ crystals were recovered. To determine the profiles, the pond was sampled at 10 cm depth intervals and the samples were analyzed. The analysis results are given in Table IV

TABLE IV

| Depth cm | Temp. °C. | Density g/cm³ | $Na_2CO_3$ g/L | $NaHCO_3$ g/L | NaCl g/L | $Na_2SO_4$ g/L |
| --- | --- | --- | --- | --- | --- | --- |
| 0 | 23 | 1.280 | 237.3 | 18.6 | 47.9 | 62.5 |
| 10 | 27 | 1.294 | 331.6 | 10.8 | 33.7 | 49.9 |
| 20 | 36 | 1.332 | 357.9 | 9.0 | 25.7 | 40.6 |
| 30 | 37 | 1.336 | 380.5 | 3.6 | 16.9 | 29.8 |
| 40 | 39 | 1.338 | 384.3 | 3.5 | 12.6 | 26.1 |
| 50 | 39 | 1.340 | 388.4 | 3.0 | 11.9 | 25.4 |
| 60 | 39 | 1.340 | 400.6 | 4.2 | 11.9 | 25.2 |
| 70 | 39 | 1.340 | 396.5 | 1.7 | 11.4 | 24.5 |
| 80 | 42 | 1.340 | 409.7 | 1.7 | 9.0 | 20.8 |
| 90 | 42 | 1.342 | 417.4 | 3.6 | 7.4 | 18.5 |
| 100 | 43 | 1.346 | 418.3 | 2.2 | 7.0 | 18.0 |
| 110 | 43 | 1.346 | 422.5 | 0.8 | 6.2 | 16.9 |
| 120 | 43 | 1.348 | 424.0 | 0 | 5.5 | 14.0 |
| 130 | 44 | 1.348 | 427.9 | 0 | 5.6 | 13.3 |
| 140 | 44 | 1.348 | 428.0 | 0 | 5.5 | 13.5 |

The $Na_2CO_3 \cdot H_2O$ crystals recovered from the pond were washed and the washed crystals were found to contain 0.05% NaCl and 0.09% $Na_2SO_4$.

Although the invention is described with particular reference to specific salt systems, it is understood that the method according to the invention is similarly applicable to mixed salt solutions or mixed brines containing other desired salts which have a higher hydrated and a lower or anhydrous form with transition temperatures in the range of temperatures prevailing in an NCSP, as well as different other salts present in the brine. It is also understood that modifications can be made without departing from the scope and spirit of the appended claims.

What we claim as new and desire to protect by Letters Patent of the United States is:

1. A method for the treatment in a non-convective solar pond having an upper portion and a lower portion and including an upper convective zone and a lower convective zone of a mixed brine containing a desired salt having a higher hydrated form and a lower hydrated or anhydrous form and containing at least one other salt, said method comprising the steps of:
   (a) adding said mixed brine to the upper portion of said non-convective solar pond;
   (b) establishing a concentration gradient in said pond for the desired salt which increases with the depth in said pond;
   (c) establishing a concentration gradient in said pond for said at least one other salt which decreases with depth in said pond;
   (d) maintaining a temperature in said lower convective zone which is at least equal to the transition temperature between a higher hydrated form and a lower hydrated form or the anhydrous form of the desired salt;
   (e) crystallizing the desired salt in a higher hydrated form in said upper portion by evaporation and/or cooling so that the concentration exceeds the saturation concentration;
   (f) dehydrating the desired salt crystallized in the higher hydrated form to a lower hydrated or the anhydrous form in said lower convective zone;
   (g) separating and purifying the desired salt in the lower hydrated or the anhydrous form in said lower convective zone;
   (h) and recovering the desired salt in the lower hydrated or the anhydrous form substantially free from said at least one other salt from said lower convective zone.

2. A method for the treatment in a non-convective solar pond having an upper portion and a lower portion and including an upper convective zone and a lower convective zone of a mixed brine containing a desired salt having a higher hydrated form and a lower hydrated or anhydrous form and containing at least one other salt, said method comprising the steps of:
   (a) adding said mixed brine to the upper portion of said non-convective solar pond;
   (b) establishing a concentration gradient in said pond for the desired salt which increases with the depth in said pond;
   (c) establishing a concentration gradient in said pond for said at least one other salt which decreases with depth in said pond;
   (d) maintaining the concentration of said at least one other salt in the lower convective zone below the saturation concentration of said at least one other salt in the solution in the lower convective zone;
   (e) maintaining a temperature in said lower convective zone which is at least equal to the transition temperature between a higher hydrated form and a lower hydrated form or the anhydrous form of the desired salt;
   (f) maintaining the temperatures in said pond at values in the range of about 0° to 100° C.;
   (g) crystallizing at least a portion of the desired salt in a higher hydrated form in the upper portion by evaporation and/or cooling so that the concentration exceeds the saturation concentration;
   (h) dehydrating at least a portion of the desired salt crystallized in the higher hydrated form to a lower hydrated or the anhydrous form in the lower convective zone;
   (i) maintaining the pond non-convective by controlling the density gradient;
   (j) separating and purifying the desired salt in the lower hydrated or the anhydrous form in the lower convective zone;
   (k) withdrawing solution from said upper convective zone; and
   (l) recovering the desired salt in the lower hydrated or the anhydrous form substantially free from said at least one other salt from said lower convective zone.

3. A method for the continuous treatment of a mixed brine in a non-convective solar pond having an upper portion and a lower portion and including an upper convective zone and a lower convective zone, said mixed brine comprising a desired salt having a higher hydrated form and a lower hydrated form or anhydrous form and transition temperatures therebetween, and a plurality of other salts, said other salts comprising one or more salts not having a higher and a lower hydrated or anhydrous form and one or more salts having a higher and a lower hydrated or anhydrous form, which method comprises the steps of:
   (a) adding said mixed brine to the upper portion of said pond;
   (b) maintaining the concentration of the desired salt in the upper convective zone below saturation concentration;
   (c) increasing the concentration of the desired salt in the upper portion by evaporation and/or cooling so that the concentration exceeds the saturation concentration, whereby desired salt crystallizes in a higher hydrated form;

(d) maintaining the concentration of said other salts at a value not exceeding saturation concentration in the lower convective zone;

(e) dehydrating desired salt crystallized in its higher hydrated form in the lower convective zone and forming solution including water liberated by said dehydrating in the lower convective zone;

(f) dissolving in said solution formed in the lower convective zone any of said other salts not having a higher and a lower hydrated or anhydrous form that may have crystallized;

(g) recovering desired salt in the lower hydrated or anhydrous form from the bottom portion of the pond, the recovered desired salt being purified and substantially free of said other salts;

(h) withdrawing solution from the upper convective zone; and (i) maintaining the pond non-convective by controlling the density gradient.

4. A method as claimed in claim 2 wherein the concentrations of the salts in the mixed brine present in the upper portion of the pond are less than the saturation concentrations of the salts at the temperature prevailing in the upper convective zone.

5. A method as claimed in claim 2 wherein the mixed brine is added to the upper convective zone and said mixed brine is substantially saturated with respect to said desired salt.

6. A method as claimed in claim 2 wherein the rate of crystallization of a higher hydrated form of the desired salt is controlled, by controlling the salt concentrations in the feed of mixed brine, by controlling the rate of addition of mixed brine to the pond, and by controlling the amount of mixed brine added to the pond and the amount of solution withdrawn from the pond relative to each other.

7. A method as claimed in claim 2 wherein solution is withdrawn in an amount such that the quantities of any salt other than the desired salt in the withdrawn solution is equal to or greater than the quantity of said any other salt in the mixed brine added to the pond.

8. A method as claimed in claim 2 wherein said pond is operated at temperatures in the range of about 0° to 80° C. and the transition temperature of the desired salt is in the range of about 30° to 70° C.

9. A method as claimed in claim 2 wherein the temperature in the lower convective zone is controlled at a temperature in the range of from a temperature at least equal to the transition temperature to a temperature about 10 Celcius degrees above said transition temperature.

10. A method as claimed in claim 2 wherein the density gradient is controlled by adding water to the pond, by controlling the concentration of other salts in the mixed brine added to the pond and by controlling the amount of solution withdrawn from the pond.

11. A method as claimed in claim 2 wherein the depth of the pond is maintained at a value in the range of about 0.3 to 3 m and is adjusted such that the temperature in the lower convective zone of the pond is at least equal to said transition temperature.

12. A method as claimed in claim 2 wherein the mixed brine contains at least two salts chosen from the group comprising consisting of sodium carbonate, sodium bicarbonate, sodium borate, sodium sulfate, sodium chloride, potassium chloride, sodium fluoride, magnesium sulfate and magnesium chloride, said salts including a desired salt chosen from the group consisting of sodium carbonate, sodium borate, sodium sulfate and magnesium sulfate.

13. A method as claimed in claim 3 wherein the mixed brine contains at least three salts chosen from the group comprising consisting of sodium carbonate, sodium bicarbonate, sodium borate, sodium sulfate, sodium chloride, potassium chloride, sodium fluoride, magnesium sulfate and magnesium chloride, said salts including a desired salt chosen from the group consisting of sodium carbonate being recovered as sodium carbonate monohydrate from the lower convective zone controlled at a temperature in the range of about 35° to 45° C., sodium sulfate being recovered as anhydrous sodium sulfate from the lower convective zone controlled at a temperature in the range of about 32° to 42° C., magnesium sulfate recovered as magnesium sulfate monohydrate from the lower convective zone controlled at a temperature in the range of about 68.5° to 80° C., and sodium borate recovered as sodium borate tetrahydrate from the lower convective zone controlled at a temperature in the range of about 60° to 70° C.

14. A method as claimed in claim 3 wherein the concentrations of the salts in the mixed brine present in the upper portion of the pond are less than the saturation concentrations of the salts at the temperature prevailing in the upper convective zone.

15. A method as claimed in claim 3 wherein the mixed brine is added to the upper convective zone and said mixed brine is substantially saturated with respect to said desired salt.

16. A method as claimed in claim 3 wherein the rate of crystallization of a higher hydrated form of the desired salt is controlled, by controlling the salt concentrations in the feed of mixed brine, by controlling the rate of addition of mixed brine to the pond, and by controlling the amount of mixed brine added to the pond and the amount of solution withdrawn from the pond relative to each other.

17. A method as claimed in claim 3 wherein solution is withdrawn in an amount such that the quanities of any salt other than the desired salt in the withdrawn solution is equal to or greater than the quantity of said any other salt in the mixed brine added to the pond.

18. A method as claimed in claim 3 wherein said pond is operated at temperatures in the range of about 0° to 80° C. and the transition temperature of the desired salt is in the range of about 30° to 70° C.

19. A method as claimed in claim 3 wherein the temperature in the lower convective zone is controlled at a temperature in the range of from a temperature at least equal to the transition temperature to a temperature about 10 Celcius degrees above said transition temperature.

20. A method as claimed in claim 3 wherein the density gradient is controlled by adding water to the pond, by controlling the concentration of other salts in the mixed brine added to the pond and by controlling the amount of solution withdrawn from the pond.

21. A method as claimed in claim 3 wherein the depth of the pond is maintained at a value in the range of about 0.3 to 3 m and is adjusted such that the temperature in the lower convective zone of the pond is at least equal to said transition temperature.

* * * * *